United States Patent [19]

Rajchman

[11] Patent Number: 4,510,390

[45] Date of Patent: Apr. 9, 1985

[54] ELECTRONIC METHOD AND APPARATUS FOR DISTANCE MEASUREMENT THROUGH THE USE OF EQUIDISTANT THERMAL FIDUCIAL MARKINGS

[76] Inventor: Jan Rajchman, 268 Edgerstoune, Princeton, N.J. 08540

[21] Appl. No.: 385,781

[22] Filed: Jun. 7, 1982

Related U.S. Application Data

[63] Continuation-in-part of Ser. No. 338,505, Jan. 11, 1982.

[51] Int. Cl.³ .................. H04N 1/024; G01J 1/00
[52] U.S. Cl. .................. 250/341; 358/294; 250/354.1; 33/127
[58] Field of Search .......... 378/6; 250/317.1, 319, 250/341, 338, 354.1; 33/127; 358/294, 295

[56] References Cited

U.S. PATENT DOCUMENTS

| | | | |
|---|---|---|---|
| 2,603,688 | 7/1952 | Cole et al. | 73/861.05 |
| 3,376,551 | 4/1968 | Armbruster | 364/900 |
| 3,541,248 | 11/1970 | Young | 358/294 |
| 4,230,938 | 10/1980 | Margdin et al. | 358/295 |
| 4,309,609 | 1/1982 | Sampson | 250/341 |
| 4,356,347 | 10/1982 | Wiener | 178/30 |

FOREIGN PATENT DOCUMENTS

56-24684 3/1981 Japan.
56-63635 5/1981 Japan.

OTHER PUBLICATIONS

Wu, "Document Reader and Printer"; *IBM Tech. Discl. Bull.*, 16 (11), Apr. 1974, pp. 3568–3569.
Yamazaki, "A Low Power Thermal Head Realizing High Quality Printing", 1978 *Components Conf. Trans.*, pp. 264–270.
Shibata, "New Type Thermal Printing Head Using Thin Film", *IEEE Trans.*, vol. PHP-12, No. 3, Sep. 1975, pp. 223–230.
Barth, "Thin Linear Thermometer Arrays for Use in Localized Cancer Hyperthermia", *IEEE Trans.*, vol. ED-29, No. 1, Jan. 1982, pp. 144–150.

*Primary Examiner*—Alfred E. Smith
*Assistant Examiner*—Carolyn E. Fields
*Attorney, Agent, or Firm*—Richard C. Woodbridge

[57] ABSTRACT

An electronic apparatus is used to measure distance by the detection and counting of a train of hot spots. The apparatus essentially comprises a heat producing means, a hot spot detecting means and electronic circuitry for energizing the heat producing means in response to the detection of a hot spot by the hot spot detecting means, whereby a train of hot pulses is produced that are spaced by the distance L between the heat producing and hot spot detecting means. A counter is used to record the number of hot spots detected by the hot spot detecting means. As the apparatus is moved, the device measures distance in increments of the separation L. An alternative embodiment is disclosed that produces two hot spots simultaneously and uses a single hot spot detecting means. The apparatus is preferably employed as part of the position reckoning means in a microcopier. However, other applications such as measuring the distance on maps, are also possible.

31 Claims, 9 Drawing Figures

ELECTRONIC METHOD AND APPARATUS FOR DISTANCE MEASUREMENT THROUGH THE USE OF EQUIDISTANT THERMAL FIDUCIAL MARKINGS

CROSS-REFERENCE TO RELATED APPLICATIONS

This application is a continuation-in-part of my copending application Ser. No. 06/338,505 filed on Jan. 11, 1982 and entitled "ELECTRONIC MICROCOPIER APPARATUS". All parts of Application Ser. No. 06/338,505 are hereby incorporated by reference in total into this application, including the "Prior Art Statement" and references submitted with the foregoing prior application.

BACKGROUND OF THE INVENTION

1. Field of the Invention

The invention comprises an apparatus and method for electronically determining distance and position on a surface.

2. Description of the Prior Art

The present invention arose from a need to conveniently determine the positions of the read and write heads of a small, hand-holdable microcopier, such as described in my copending application Ser. No. 06/338,505 filed Jan. 11, 1982. The portion of that application entitled "Description of the Prior Art" and the "Prior Art Statement" filed with that application contain a relatively complete description of the prior art relevant to said microcopiers. According to the disclosure of the invention in application Ser. No. 06/338,505, the position of the writing head and the position of the reading head relative to the surface of the paper were determined by markings on a wheel rolling on the surface of the paper. As the wheel rotated, the markings were detected and counted. The resulting count represented a measurement of the position of the microcopier over the surface of the paper. The present invention provides a way to reckon the position of the microcopier on the surface over which it is moved and involves no wheels or any body moving with respect to the microcopier.

The detection of heat on a surface is known in some areas of the prior art. See for example, the article entitled "Thin Linear Thermal Thermometer Arrays for Use in Localized Cancer Hyperthermia" by P. W. Barth and J. B. Angell, pages 144–150, Volume ED-29 #1, January 1982, IEEE Transactions on Electronic Devices. It is also believed that the following references may be relevant to the detecting of heat spots and the printing of information using thermal printing heads:

"New Type Thermal Printing Head Using Thin Film" S. Shibata, K. Murasugi & K. Kaminishi, pages 223–230 Volume PHP-12, #3, September, 1975, IEEE Transactions on Parts, Hybrids and Packaging; and;

"A Low Power Thermal Head Realizing High Quality Printing" by J. Yamazaki & M. Terashima, 1978 Components Conference Transactions, pages 264–270.

Insofar as can be determined, the invention appears to be novel in the context of the relevant prior art.

SUMMARY OF THE INVENTION

Basically described, the present invention is an improvement over the "ELECTRONIC MICROCOPIER APPARATUS" described in my copending application Ser. No. 06/338,505 filed on Jan. 11, 1982. The microcopier of that first invention includes a reading head, a random access electronic memory (RAM), and a writing head, all contained within a small case that may be held in the hand. In the reading mode, the instrument is passed over images, such as written text, and the responses of a number of photosensors are recorded in the memory. The memory stores the information until the device is used in the writing mode. In the writing mode, the information from the memory is fed to a number heaters and is faithfully reproduced on a piece of thermo-sensitive paper as the instrument is passed over it. A wheel with angular markings rolls as the copier is manually displaced in both reading and writing modes. A count of the passage of the markings on the wheel measures the position of the copier. That count is used to directly address the memory. The markings on the wheel are sensed optically. Other means could be used. For example, the markings could be made by a magnetic material and their passage detected by induction, the detuning of a resonant circuit, or by the Hall effect. However, the movement of a mechanical wheel is believed to be cumbersome and to take up unnecessary space. Therefore it is desired to reckon the position of the copier by a purely electronic means. Even such a simple device as a rolling wheel require rugged and precise construction and is subject to wear and accidental damage.

The preferred embodiment of the invention described in copending application Ser. No. 06/338,505 comprised an elongated body or housing roughly the size of an ordinary pen or pencil. A reading head including a number of optically sensitive elements located along a line was located at one end of the pen. The pen is preferably held in the user's hand and swept over images on the paper. The images can be text as well as symbols. In the case of text the length of the line being read, which is oriented vertically with respect to the path of the pen, is about twice the height of the letters of the text to be copied. As the text is read by the reading head the information is stored in the electronic section between the reading head and the writing head. The electronic section includes a battery section for batteries and a memory. The line of text to be copied is scanned manually by moving the electronic pen over it. The line of photosensors within the pen is oriented vertically, so that each sensor sweeps a horizontal line, and many lines are swept simultaneously. The sensors, and hence the sweeping horizontal lines, are spaced sufficiently close to one another so as to provide sufficient detail. As the electronic pen is scanned over the text variations of light are sensed by the optical sensors which are typically semiconductor diodes or photo transistors. The corresponding signals are stored in Random Access Memory (RAM). The memory has words with as many bits as there are sensors. That is to say, all signals are stored in parallel. The addresses under which these signals are stored are determined from the angular position of the position-determining wheel or cylinder which rolls over the paper as the pen is swept across it. The roller wheel also helps in guiding the pen. Angular spaced marks on the wheel are optically detected in a manner similar to that used for the information being scanned. Corresponding signals activate a counter which in turn addresses the memory. The marks on the wheel are angularly spaced sufficiently close so as to correspond to the horizontal linear spacing on the paper, roughly equal to the vertical spacings determined by the spacings of the sensors. After the scan the information is stored in the memory. This information can be used immediately for writing or it can be left in storage for as long a period as desired. In the writing or printing mode, the electronic pen is turned over so that the thermal writing heads are in contact with the paper. A thermally sensitive paper is used for reproduction purposes. Such papers are in common use in many applications and are available in rolls of various widths. In the writing mode the pen is again manually swept across the paper. Another position locating wheel is provided at the writing end of the pen. It has identically spaced marks that provides signals as the wheel rolls over the paper. These signals activate a counter (which can be the same as that used in the reading mode) which in turn addresses the memory. Hence, successive addresses are activated and the corresponding outputs from the memory activate the heater elements. All of the heater elements are activated in parallel. In effect there is an individual channel for each of the fine lines being scanned. A channel comprises a sensing diode fed by a fiberoptic lead, an amplifier, a bit of the word of the memory, an output amplifier and a heater element. All of the circuitry, including the diodes are fabricated by large scale integration (LSI) technology. In view of the foregoing it is evident that the original text read by the pen and wheel at one end of the structure is accurately reproduced, because the dots resulting from the heat of the printing element have the proper vertical location (since the printer heater elements are spaced exactly the same as the reading sensors) and the proper horizontal positioning (since the positioning depends upon the marked spacings on the read and write wheels respectively). The manual sweep across the text can proceed at any speed since the horizontal location of the device is monitored by the reading and writing wheels.

According to the present invention the reckoning wheels described in my copending application Ser. No. 06/338,505 are replaced by an electronic means which measures the position of the microcopier apparatus as it is moved over the surface of the paper. The means comprises a heater element and a heat detecting element. The heater element is pulsed and causes the small area of the paper it touches to become hot. Subsequently, when the heat detecting element reaches the hot spot it causes the heater to be pulsed and to create another hot spot. When the second heat spot is detected the heater is again triggered to produce a third spot. The process continues indefinitely creating a train of hot spots. The successive detected signals are counted. Since the distance L between the heat spot producing element and the hot spot detecting element is fixed, the distance traveled by the microcopier over the paper is simply the product of the count by the distance L.

The basic invention can be employed on devices other than microcopiers. For example, it could be used to determine the distance between two points on a map. These and other features of the present invention will be more fully understood by reference to the following drawings.

DETAILED DESCRIPTION OF THE PREFERRED EMBODIMENT

During the course of this description like numbers will be used to identify like elements in the different views that illustrate the invention. Also, as previously described, this detailed description of the invention incorporates by reference all of the disclosure that may be found in my copending application Ser. No. 06/338,505 filed Jan. 11, 1982. Therefore, the numbering sequence employed starts with the number 500 so as to be consecutive with the numbering system employed in application Ser. No. 06/338,505.

Figure 1A:
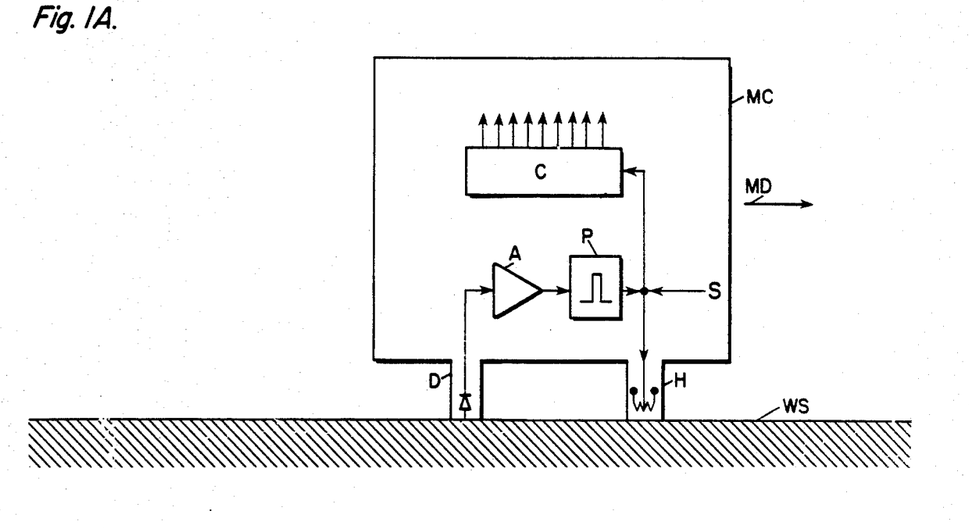
FIG. 1A is a schematic representation of the principal of the invention.
Figure 1B:
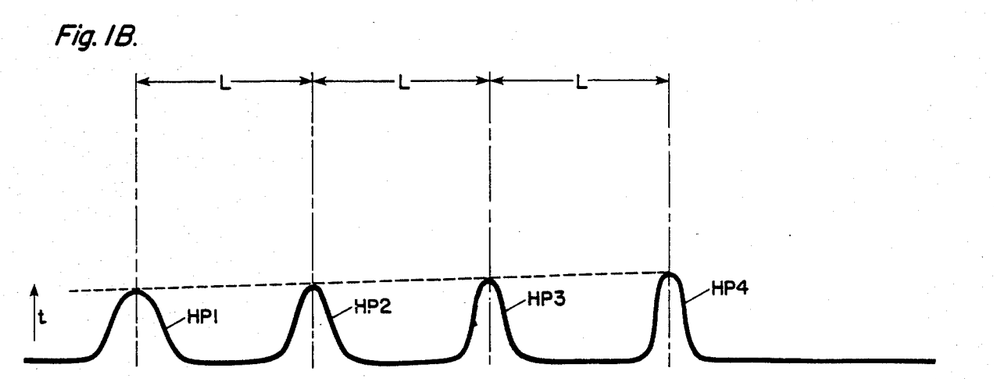
FIG. 1B illustrates the characteristics of the heat spots produced by the apparaus illustrated in FIG. 1A.
Figure 2A:
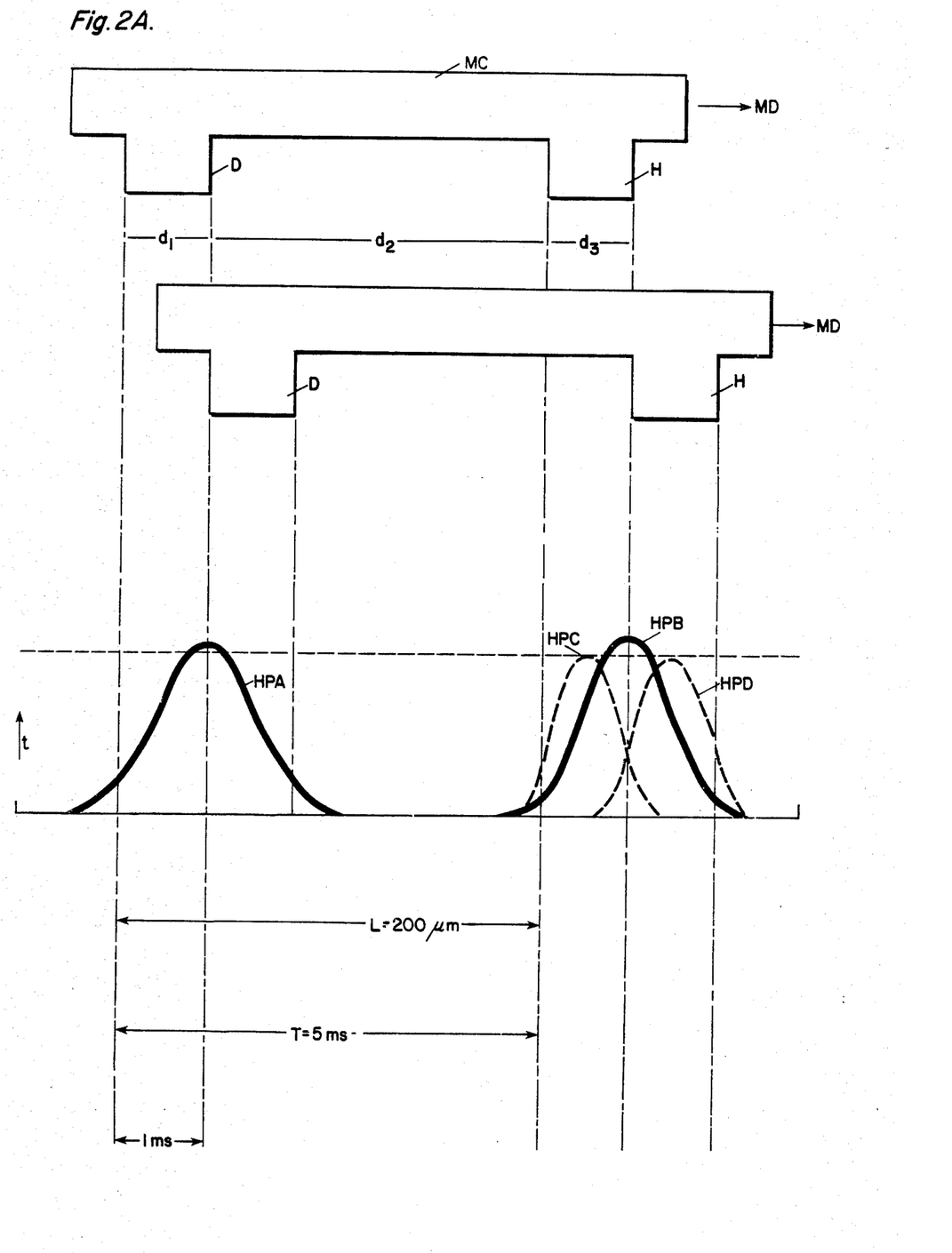
FIG. 2A illustrates in greater detail the heat spot characteristics of the invention described in FIG. 1A.

The basic operation of the positions reckoning means of this invention is illustrated in detail in FIG. 1A, 1B and 2A. As shown in FIG. 1A, the microcopier MC carries a heat spot producing means H and a heat spot detecting means D spaced apart by a distance L. The output of the heat detector D is amplifier by amplifier A and shaped in pulsing circuit P in such a way as to trigger a short duration heat pulse or heat spot HP1. Heater H is pulsed when the detected temperature t is above a given value. The short electrical pulse drives the heater element in heater H. As a result a new hot spot HP2 is produced on the surface WS of the paper. When the microcopier MC is moved in its sweeping motion direction MD, the heat detector D will reach this hot spot HP, will energize the pulser P, and produce still another hot spot HP3. Hence a series of hot spots HP1, HP2, HP3, and HP4, etc. will be produced on the paper WS as the microcoper MC is swept over its surface, provided, of course, that there was a hot spot HP0 to initiate the train of pulses. Therefore a means is necessary to produce the initial spot HP. This means is described later on. Therefore it is assumed for the purposes of discussion that there is an initial hot spot HP0. The hot spots HP will be spaced by the distance L between the detector D and the heater elements H. The distance L is chosen as the distance between the pixels or elements of the image to be copied. It typically may be in the neighborhood of 200 microns. The distance between consecutive spots HP is exactly the distance L between the detector D and the heater H, regardless of the speed at which the microcopier MC is being moved. Hence, counting the pulses of the pulser P, will be a direct measure of the position of the microcopier MC. A binary counter C is illustrated in FIG. 1A as connected to the output of the pulser P and adapted to count the pulses as they are received from the pulser P.

If the counter C is binary its stages can directly drive the address register of the memory of a microcopier MC such as disclosed in my copending U.S. application Ser. No. 06/338,505. FIG. 1A suggests schematically the elements of the microcopier MC (or the body of the instrument in which distance is to be ascertained). The elements of the microcopier MC comprise the heat detector D, the amplifier A, the pulse circuit P, the heater element H, binary counter C and the surface WS of the paper over which the microcopier MC is swept in direction MD.

FIG. 1B illustrates how the temperature t of the surface WS of the paper varies as a function of distance. A typically bell-shaped temperature distribution HP is created just below the pulse-heater H. The distribution of the temperature t of the heat pulse HP persists for a relatively long time because the paper is a poor conductor of heat and because it is heated to temperatures for which radiation is so small as to be negligible. Typically the cooling proceeds with a time decay constant measured in seconds. On the other hand, the transmit time T of the microcopier MC over a pixel spacing is measured in milliseconds. Hence when the heat detector D reaches a hot spot HP created during the instant preceding its arrival by T, the distribution of temperature will have hardly changed. The very small reduction in the height of the pulse HP and the very small widening of the bell-shaped temperature distribution of the successive hot spots HP is illustrated in FIG. 1B in slightly exaggerated fashion. The hot spots HP act as equally spaced fiducial markings on the paper surface WS which conveniently exist and can be counted when the microcopier MC passes over them. The heat spots HP also have the added advantage of disappearing in seconds without altering the paper.

The following is a more detailed analysis of the thermal reckoning means and its operation. In general a thermal fiducial marking must not be hot enough to darken the thermal sensitive paper surface WS on which the microcopier MC reproduces the original information (although in principle there is no such restriction when reading). In most commercially available paper types, a slight darkening occurs at about 115° C. Actual writing temperatures yielding optical densities of 60% to 80% are in the range of 200° C. to 300° C. Hence the nominal temperature to which the fiducial markings are brought to must be well below 115° C., in order to assure that no darkening will occur, even when the actual temperature deviates from the nominal due to normal variations within reasonable tolerances. A very safe temperature is 65° C. at which thermal sensitive papers have been stored for extended periods of time with no appreciable darkening of the paper under those conditions. Such a temperature is still well above the normal ambient temperature by more than 30° C.

In principle the surface temperature of paper WS could be measured through its radiation. In fact, laboratory determinations of the temperature distribution of thermal heater heads 4 and of the heated paper spots HP were made by measuring their infrared radiation. At 65° C. the radiation is very small and peaks at a wave length of about 8 microns which can be sensed only with cooled detectors. Pyroelectric detectors could also be used but they require the use of special materials other than silicon.

Direct contact thermometers have been found to be suitable for relatively low temperature ranges. A particularly suitable thermometer of that type would be a semiconductor diode. The current through a forward biased diode varies with temperature. In the temperature range of 30° to 65° C. the voltage across a diode driven with a constant current varies by about 2 millivolts per degree centigrade. Hence a substantial signal of about 60 to 70 millivolts would be obtained if the contacting diode actually reached the temperature of the fiducial thermal markings. Even if it reached a very small fraction of that temperature rise, still a very substantial signal would be available. A diode is especially useful in the present circumstances since it can be made integrally on the same silicon chip that carries the document-reading photo diodes, the document-reproducing thermal heads, their associated circuits, a shift register or even the random access memory. Of course the chip would also carry the heater H for creating the thermal fiducial markings.

A contacting diode is a very sensitive thermometer, but unfortunately it does not respond as fast as a radiation measuring diode, since its own mass must be heated and cooled in response to the variations of temperature. If the diode is made integrally with all other components on a single chip with geometries similar to that of the heaters, then it is fairly certain that its response will be fast enough. Heaters H so constructed and so driven will produce distinct heat spots spaced a pixel apart. It is thus possible to make the thermometer-diode D in the same geometry as the heaters H and with materials of the same conductivity to guarantee sufficiently fast response. In the implementation described later the diodes are made in that fashion.

The following analysis and experimentation relates to the thermal response of various types of heating heads H which are very pertinent to the present invention and which corroborate the fact that the operating characteristic of a contacting diode made similarly to a heater will have the same time response. Therefore, such a diode is fast enough for position reckoning means. In general a heater H can be heated as fast as desired by simply using enough heating power. However, its rate of cooling depends on how well the heat can be conducted away. In order to obtain a fast response it is necessary to provide very good heat dissipation. This is obtained by mounting the heater on adequate thermal conductors that conduct the heat to a heat sink. Of course, the more heat that is dissipated to the heat sink, the faster the cooling rate and hence the better the overall thermal response. It has been found that 75% to 85% of the power generated has to be wasted in order to obtain cooling time constants of less than a millisecond. Hence only 15% to 25% of the power of the heater is actually transferred to the paper.

The following example illustrates the relevant points. FIG. 2A illustrates an abstract embodiment in which the distance L between the heater H and the sensor D is 200 microns. The width of the heater head H and the diode sensor D is 40 microns each. Because of the thermal time constant of the heater head H, the surface remains hot for a period of time approximately equal to the thermal time constant regardless of how short the heat pulse HP may be. In this example, it is assumed that the head H remains hot for one millisecond. During that time the heater H will move since the microcopier MC slides over the paper without being stopped at each pixel. Hence the distribution of temperature of the hot spot HP will widen. An important feature of the microcopier MC is that it can be displaced over the surface WS of the paper at any speed. No restrictions are made on the operator of the microcopier MC. The maximum likely speed is about 4 cm/sec, at which speed the width of an ordinary typewriter sheet is swept in approximately 5 seconds. Therefore the microcopier MC will move by 40 microns during the 1 millisecond period at which the heater head H is hot. Since the width of the head H is also 40 microns, the width of the heated spot HP on the paper will double. This is illustrated in detail in FIG. 2A. Should the microcopier MC be moved faster, the width of the hot spot HP will widen even more. However great the widening, the spacing between the maxima of temperature (or of any given temperature) of consecutive hot spots HP1, HP2, HP3, etc. will still remain the same, since all spots HP will be "delayed" by the same distance. This phenomenon is apparent from the inspection of FIG. 2A. Hence the widening of the heat pulses HP due to the motion of the microcopier MC has no effect on the position determination of the device through the technique of counting hot spots HP.

There is, however, an effect that does alter the spacing of the hot spots HP, namely the response time of the detecting diodes D and the heater H. It takes a certain period of time for the diode D to reach the temperature at which it triggers the current pulse P of the heater H. Similarly, it takes the heater H a certain time, $t_h$ to reach its effective temperature. Hence, there is an unavoidable delay $t_d = t_s + t_h$ in creating one spot as a result of sensing the preceding one. During that time the microcopier MC will move by distance $1 = t_d \times v$, where v is the velocity of the microcopier MC.

The delay time $t_d$ can be reduced by choosing the triggering temperature of the sensor D to be just above the maximum ambient temperature expected and by using an intense heater current pulse P for the heater H. A conservative estimate of the resultant total time delay $t_d$ is 1 millisecond.

Since complete freedom of motion of the microcopier MC is one of its essential advantageous attributes, the velocity v is unknown by definition. However, the maximum velocity, reached after an acceleration period, can be estimated to be from 2 to 4 cm/sec, which corresponds to sweeping a line on an ordinary typewriter in 10 to 5 seconds. Hence 1 is 20 to 40 microns in our example, or 10% to 20% of L, where L has the nominal value of 200 microns. The actual distance between spots, $L' = L + 1$, can best approximate the distance between pixels $L_p$ by choosing $L = L_p - 1_{average}$. In our example $1_{average}$ is 30 microns, hence the optimum choice for L is 170 microns. With this choice the distance between consecutive spots L' varies between 190 and 210 microns, depending upon the velocity. This is within ±5% of the nominal value and corresponds to a slight contraction or elongation of the reproduced image that can hardly be noticed and that is perfectly acceptable.

The error in spot spacing due to the unavoidable delay that is inherent in sensing one spot and creating the next one is very small when the delay is properly minimized to 1 millisecond or less as previously explained. While this is perfectly feasible a larger delay can be tolerated with another alternative method for reckoning the position of the microcopier MC.

According to an alternative method and apparatus two heaters $H_1$ and $H_2$ are used. These heaters are spaced exactly apart by the desired pixel distance $L_p$. The two heaters $H_1$ and $H_2$ are pulsed simultaneously and thereby create two hot spots on the surface of the paper which are spaced exactly $L_p$ apart regardless of what delay there is in the process of their creation. The time T which the microcopier MC takes to move the distance $L_p$ can be measured by counting the periods of an oscillator, chosen to be much shorter than T, that occur between the sensing of the spot created by heater $H_1$ and the spot created by heater $H_2$. That measurement is independent of the delay in sensing. The periodic measurement of T as the microcopier is displaced are used to trigger the heater pair H1 and H2 and are also used to advance the memory counter.

Figure 2B:
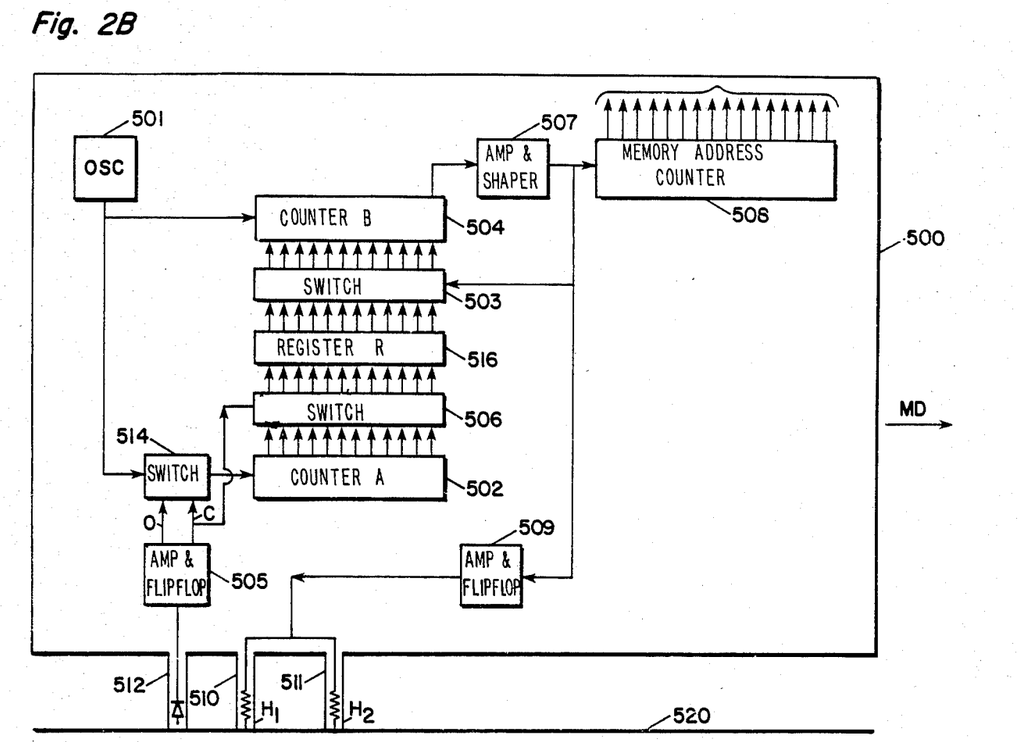
FIG. 2B is a schematic illustration of an alternative embodiment of the invention.
Figure 2C:
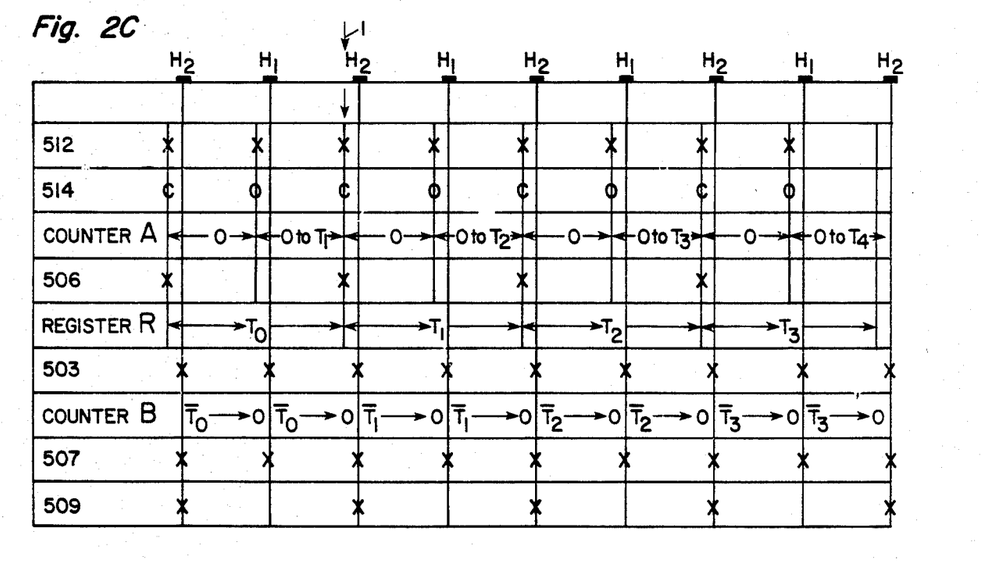
FIG. 2C is a table illustrating the reaction of the elements shown in the alternative embodiment of FIG. 2B.

The operation of the two heater systems 500 can be understood in greater detail by referring to FIG. 2B and the associated table of events FIG. 2C. The two heater system 500 comprises essentially two independently working circuits. The first circuit comprises sensor 512 with its associated counter A (element 502) and circuits 505, 506, and 514. The second circuit comprises counter B (element 504) and associated circuits 503, 507, 509 and heaters $H_1$ (element 510) and $H_2$ (element 511). The two circuits are each clocked by oscillator 501 and each run with its own rhythm. A register R (element 516) provides communication between the two circuits.

Initially it is assumed that the system is in its steady state after some initial settings. The table in FIG. 2C illustrates the state and function of the various circuit parts as a function of time. The time on the table is that at which the heater $H_2$ has reached a given position on the surface of the paper 520. The consecutive hot spots created by heaters $H_1$ and $H_2$ are shown on the line above the table.

Initially the first circuit loop which measures the time intervals $T_0$, $T_1$, $T_2$, etc. will be considered. Those time intervals correspond to the time which the microcopier MC takes to traverse the standard interval $L_p$ between the consecutive hot spots of heaters H1 and H2. At the beginning the heater $H_2$ of the microcopier MC has reached the second $H_2$ hot spot (as indicated by initiating arrow I above the table shown in FIG. 2C) at a time when the sensor 512 has just sensed the previous $H_2$ hot spot. The results of that sensing is amplified by circuit 505 which also includes a flip-flop pair. The flip-flop determines whether switch 514 is open or not to pass oscillations from the oscillator 501 to binary counter A (element 502). If switch 514 is closed the oscillator 501 does not pass its pulses to binary counter A (502). The closure of switch 514 also activates switch 506 which has two functions. The first function is to transfer the contents of counter A (502) to register R (516). The second function is to clear counter A (502) to 0. At the instant of interest switch 514 is closed thereby transferring the previously stored information of counter A (502) at $T_0$ to register R (516) while at the same time counter A (502) is cleared to 0. Just before the microcopier MC reaches $H_1$ (i.e. just before its $H_2$ heater reaches the next spot produced previously by its heater $H_1$) the switch 514 opens and counter A (502) starts to count. Just before microcopier MC reaches the next spot $H_2$, the switch 514 closes and the counter A (502) contains a measure $T_1$ of the time it took the microcopier to traverse the interval $L_t$ from $H_1$ to $H_2$. From there on the operation is repeated and the counter A (502) contains successfully $T_1$, 0, $T_2$, 0 $T_3$, 0, etc.

Consider now the operation of the second circuit loop containing binary counter B (504) and associated circuits 503, 507, 509, heaters $H_1$ (510) and $H_2$ (511) and the memory address counter 508. At the instant at which microcopier MC reaches the second $H_2$ hot spot (just after the arrow on the table in FIG. 2C), switch 503 is activated by switch 507 which in turn is activated by the switching of the most significant digit in counter B (504) from 1 to 0 by an operation subsequently explained. The activation of switch 503 produces two results. The first result is the clearing of register R (516) to 0. The second result is that the contents of register R (516) are transferred to counter B (504). Rather than the number itself its complement is transferred, that is, all zeros are transferred as ones and all ones are transferred as zeros. Adding counts to a complementary binary number until it reaches the maximum possible count, that is to say, until all binary positions are 1's is equivalent to "uncounting" the original non-complemented number. Hence when the most significant digit of the counter B (504) reaches 1 the counter B (504) will be precisely "uncounted" of the last count it received from register R (516). The next count will produce all 0's in the counter B (504), effectively clearing it for receiving the next transfer from R (516) and this count will also signify the end of one period time T and the start of the next. This pulse is appropriately amplified and shaped by circuit 507 and is fed into the memory address counter 508 and advances it by one step. That pulse is also fed to circuit 509 which contains a flip-flop pair as well as an amplifier. At every other position of the flip-flop the amplified and properly shaped pulse is fed to the pair of heaters $H_1$ and $H_2$ and causes the next pair of hot spots to be created on the surface of the paper 502.

When the microcopier reaches the first $H_2$ spot (just after the arrow on FIG. 2C) the Register R (506) contains $T_1$ which it acquired when switch 514 was closed. At that point switch 503 will transfer $T_1$, complemented, or $\overline{T}_1$ to counter B. Note that the next transfer from R (516) to B (504) will also be $\overline{T}_1$ since the register R (516) still contains $T_1$. However the next transfer after that will be $T_2$. In effect every measure of transit time $T_i$ is used twice, once when the microcopier MC moves over the nominal distance $L_p$ between a spot produced by heater $H_1$ and a spot produced by heater $H_2$, and a second time when it moves between "standard" pairs, that is, between a spot $H_2$ and a spot $H_1$ a distance which may differ slightly from $L_p$ since it is required by the system to be traversed in exactly the time it took to traverse the preceeding standard interval, and yet the velocity transfer may have changed slightly. Hence the system allows a gradual change of velocity and produces almost equidistant spots, that is, spots alternatively spaced by $L_p$, $L_i$, $L_p$, $L_{i+1}$, $L_p$, $L_{i+2}$, etc.

In order to insure that the instants at which information is transferred from R (516) to B (504), at which a new $T_i$ is to be used (after twice use of $T_{i-1}$), the distance between the sensor and the heater $H_1$ is deliberately made smaller than the distance $L_p$ between heater $H_1$ and heater $H_2$. That distance could be as short as half $L_p$ in which case the delay between the activation of switch 505 and the arrival of the sensor on the hot spot could be almost ½T.

In the example illustrated in FIGS. 2B and 2C, the spacing between heaters $L_p$ equal to the nominal spacing of pixels, is 200 microns. The frequency of oscillation of the oscillator 504 is not critical, and can be controlled simply by an RC network (no crystal required). It can, for example, be 200 kHz, corresponding to a period of 5 microseconds which is about one thousand times shorter than the time T necessary to traverse one interval at the velocity of 4 cm/sec. Hence, binary counters A (502) and B (504) and register R (516) have 12 binary positions, allowing a total count of 4,096, and thereby providing a large margin of safety. It is not difficult to arrange all switches so that they react in less than 5 microseconds. Therefore no error due to delay in switching of any of these circuits is anticipated. The distance between the sensor and heater $H_1$ should be shorter than the spacing between heater $H_1$ and $H_2$. As was mentioned above, it could be, for example, 150 or 170 microns.

Therefore, two alternative embodiments and methods in distance measurement are possible by counting thermal fiducial markings—as has been described above. In the first, a single heater H and a sensor D are used together with relatively simple direct triggering circuits. That arrangement is described in FIGS. 1A, 1B and 2A. For accurate spacings of the markings, the time delay in creating one spot on the basis of the preceeding one must be very short compared to the transit time between consecutive spots. Short delays, that is delays of no more than one millisecond, are achieveable and result in perfectly acceptable deviations in spot spacing for microcopier MC velocities of up to 4 cm/sec. According to the second embodiment 500 illustrated in FIGS. 2B and 2C, two heaters $H_1$ and $H_2$ and a single sensor D are used together with relatively more complex triggering circuitry. In the second embodiment 500, the time delay in creating a pair of spots on the basis of the preceeding pair can be as much as half the transit time between consecutive spots and yet the spacing between consecutive spots remains constant for all practical purposes. The extra complication of the circuitry may entail little additional cost, in fact it may entail a negligible additional cost, since these circuits can be and should be produced by large scale integration (LSI) on the same chip that carries the other circuits and the memory of the microcopier MC. The second embodiment 500, while more complex in concept and slightly more complex in implementation, has the advantage of tolerating relatively large time delays in response to the sensor D and heaters $H_1$ and $H_2$, thereby simplifying the construction of these transducers and allowing greater tolerances in operation. Also transit velocities greater than 4 cm/sec. are possible. The redundancy of the two heater system 500 also adds greater reliability to the device.

In still another alternative more than two equally spaced heaters could be used and thereby create simultaneously more than two hot spots. One could even envisage the simultaneous creation of all the hot spots of a train over the distance to be measured. However the use of two heaters only insures already the quasi equality of the interspot distances, hence the use of more heaters may be an unnecessary complication.

The transfer of heat from heater H of the invention to the paper WS depends in general on the pressure of the head against the paper as well as on the properties of the surface of the paper—such as its smoothness. In practice it is necessary to heat the heater H to a higher temperature than that to which the surface of the paper WS is to be brought. Typically thermal heads are brought to 300° C. to heat the paper to about 200° to 250° C. Similarly, the heater head H of the heater-sensor-distance-measuring-pair must be brought to about 80° to 100° C., in order to bring the surface of the paper to about 65° to 70° C. By the same token the detection diode D will not reach the temperature of the paper, but only a temperature such as 50° or 55° C. The actual rise in temperature necessary to produce a reliable triggering need only be a few degrees. Hence the relative inefficiency of heat transmission to the detector can be tolerated. Such small rises in temperature are within the normal variations of ambient temperature. To avoid the masking effects of ambient temperature, a comparison can be made between the response of the sensing diode D and another identical diode sliding on the surface of the paper in a region that is not heated. A conventional bridge or other circuit is used to implement the comparison.

It is also possible to use two inter-laced tracks of hot spots or thermal fiducial markings. In each track the spots are spaced 2L apart. The spots of one track are displaced with respect to the spots of the other by the distance L. In each track there is a full circuit complement consisting of a sensing diode, a comparison diode, amplifiers, comparison circuitry, pulse triggering circuitry and heater. Pulses occurring in each track are counted by the same counter which thus receives a count for every displacement by L of the microcopier. Consequently the memory registers the responses of the photosensors for each interval L, as needed for the proper functioning of the microcopier. The use of two tracks with larger spacings makes the construction of the diodes and heaters considerably easier, and reduces direct heat conduction from heater to diode.

Given the foregoing information it is possible to construct a purely electronic means of ascertaining the position of a microcopier MC as it moves over a document to be copied and over the paper on which the copy is made. There is no further need for rolling wheels as described in my copending application. Also, the elements necessary for position determination are relatively simple given this disclosure and of the same kind as those needed to sense and write the information. These elements, i.e. sensing diodes and heaters with associated circuitry, can be made as part of the integrated silicon chip which carries all of the other elements of the microcopier MC. In fact, the addition of these elements is easily integratable with the other elements of the microcopier MC and therefore the position ascertaining means is obtained at essentially zero additional cost. More importantly though, the position ascertaining means, also referred to as the position reckoning means, is far more reliable than a rolling wheel or any other mechanical device.

One way to implement the thermal fiducial marking means to ascertain the position of the microcopier MC is to incorporate the heater-detector pair in a silicon chip that carries all of the other active elements of the microcopier MC, as was previously discussed. Specifically, the heater-detector pair can be added to the microcopier MC described in my copending application and denoted generally by the number 200 therein.

Figure 3:
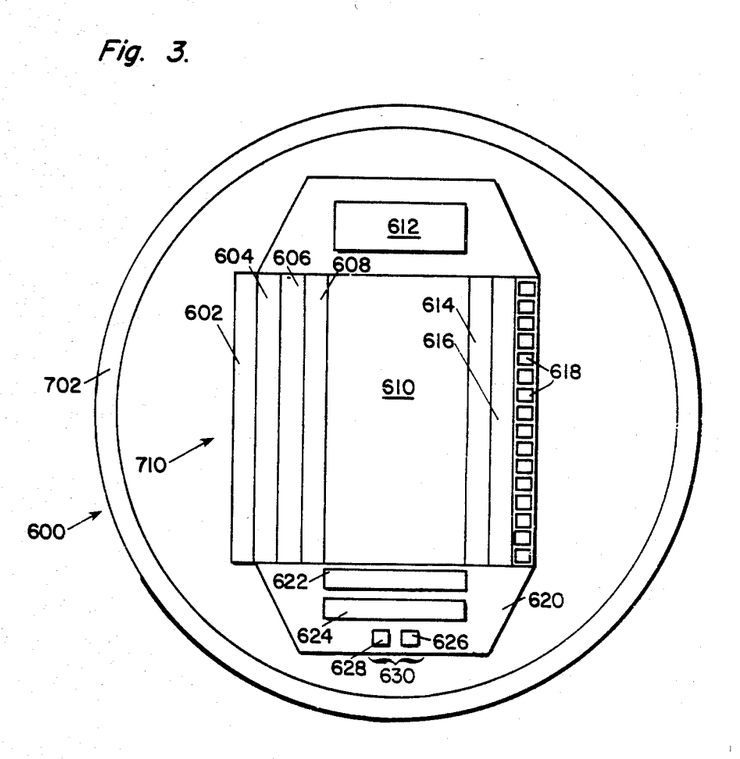
FIG. 3 illustrates the underside of the preferred embodiment of the invention in which the distance measuring apparatus and method is employed in a hand-held microcopier.

The preferred embodiment of the microcopier MC in a pen-like shape is illustrated in FIGS. 3 through 5B. A bottom view of the instrument 600 is illustrated in FIG. 3 in an enlarged scale. The silicon chip 620 carries essentially all of the necessary parts for a microcopier MC having 32 channels and a memory of 32×2K. The instrument 600 is contained entirely within a case 702 further illustrated in FIGS. 5A and 5B. The elements of the preferred embodiment of the invention illustrated in FIG. 3 comprise in sequence: A 32 PIN sensing diode array 604; associated amplifiers 606; a memory input register 608; a RAM 32×2K memory 610; a memory output register 614; heater amplifier 616; and 32 mesa-shaped heaters 618. Additionally the chip 620 includes a memory address register 622, a binary counter 624 that counts the pulses from sensing diode 628, a heater 626 and associated logic circuit 612. The heat sensing diode 628 and the heater 626 comprise a heater-sensor diode pair 630 made of two mesas. An abutting gallium arsenide chip 602 carries an elongated LED light source or, alternatively, a row of 32 LED's. The arrangement of the silicon chip 620 and the abutting gallium arsenide chip 602 are illustrated in FIG. 12 of my copending application previously described.

With respect to the silicon chip 620, the major modification of the present invention over the one described in my copending application is in the addition on the chip 620 of the heater-sensor distance ascertaining pair 630 and its associated binary counter 624. The general structure of the chip is preferably made according to technology similar to that described in U.S. Pat. No. 3,982,093 of H. S. Henrion and 3,769,562 of K. E. Bean. The techniques for making heater-mesas described in those patents are especially suitable for making the heater-detector distance measuring pair 630 according to the present invention.

Figure 4:
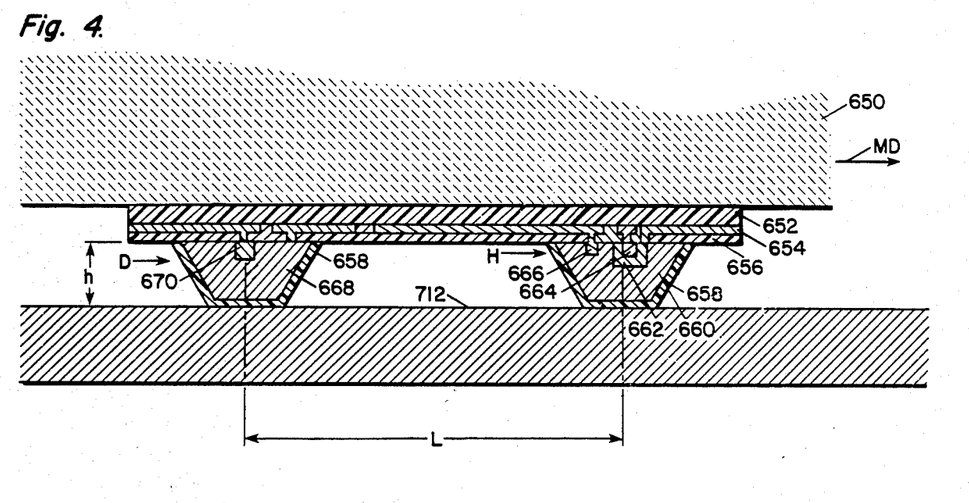
FIG. 4 is a detailed, cross-sectional view of the integrated position measuring element 630 of the device illustrated in FIG. 3.
Figure 5A:
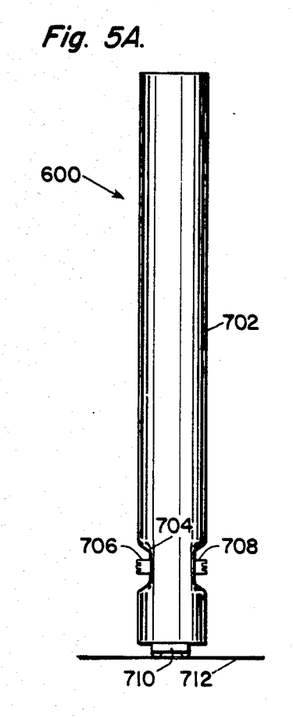
FIG. 5A is an exterior elevational view of the preferred embodiment of the invention showing the microcopier incorporated into a hand holdable pen-like case.
Figure 5B:
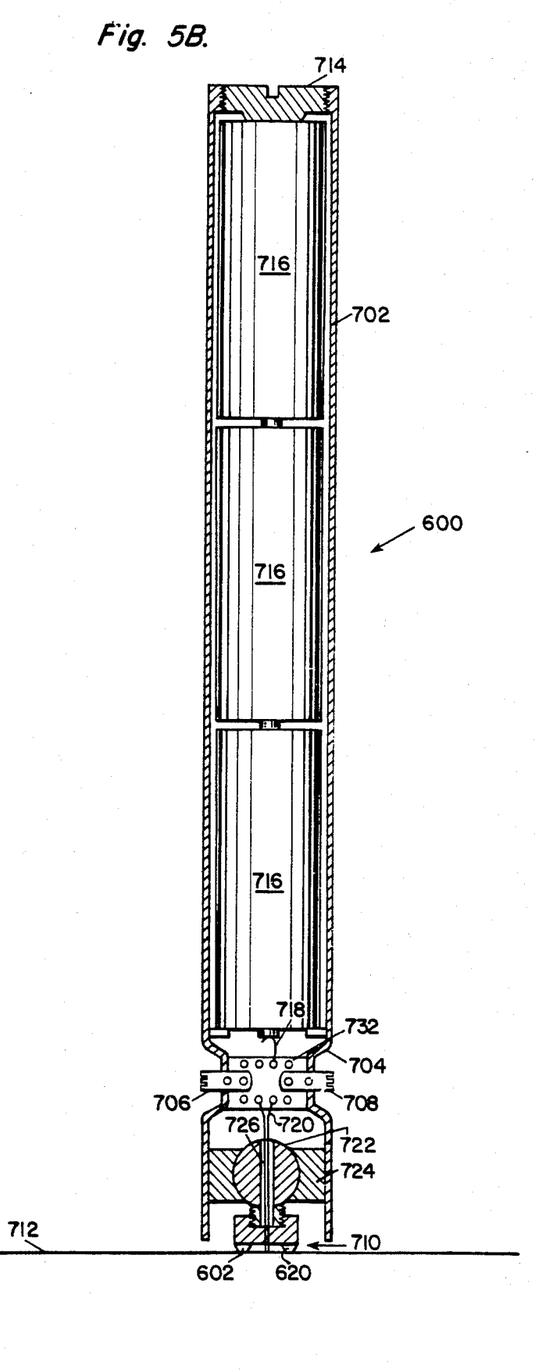
FIG. 5B is a detailed cross-sectional view of the microcopier shown in FIG. 5A according to the preferred embodiment of the present invention.

The heater-detector distance reckoning part of the integrated structure 710 illustrated in FIGS. 3 and 5A and 5B, is shown in detail in FIG. 4. That structure includes the following specific elements: a ceramic substrate 650; an epoxy layer 652; a metal layer 654; an insulator layer 656; a heat protection layer 658 for protecting the heater head H of the apparatus; N-type semiconductor regions 660, 664, and 666; a P-type semiconductor region 662; an N-type semiconductor region 668 in the detector D section of the apparatus and a P-type semiconductor region 670 in the detector head D. The apparatus is shown in position moving in a direction MD over a piece of thermal sensitive paper 712. As shown in FIG. 4 a heater transistor combination is used instead of a more conventional simple ohmic heater. To lower the signal required to activate the selected heaters only one transistor is used. The detecting PN diode is made within a mesa by the same technology, as already described above.

A memory of 65K can easily be contained in an area smaller than the cross-section of an ordinary pen. Therefore the memory of the microprocessor can be on the same chip as the photosensors, amplifiers, heaters, logic circuits, etc., rather than on a separate chip located at another location such as the handle of the apparatus. According to the present invention the silicon chip 620 and its abutting gallium arsenide chip 602 contain all of the active components of the microcopier MC. The case 702 needs to contain only the batteries 716 and switches 706 and 708 as illustrated in FIG. 5.

The construction illustrated in FIG. 4 has a number of advantages. Firstly, the active face of the chip 620 is hermetically sealed by epoxy layer 652 that holds it against ceramic substrate block 650 thereby eliminating the necessity of any other "passivation". That arrangement also provides good thermal contact with the heat-sink ceramic as pointed out by the Henrion-Bean patents. Secondly, since the inputs are optical signals and the outputs thermal signals, there are no electrical leads carrying information to and from the silicon-gallium arsenide integrated working assembly. The only electrical connections needed are power supply leads and two or three leads to command a reading or writing mode. The half a dozen or so necessary connections can be made on pads that are located in a conventional manner on the sides of the chip 620. The contacts could also be in the very center of the chip in which case they could be threaded directly through the sphere 722 used in the gimbal support as described in further detail in FIG. 5B. Thirdly, large scale integrated (LSI) circuit technology is used to produce a single component, namely, the silicon and gallium arsenide chips head assembly 710. The rest of the copier comprises mostly the case 702, a bank of batteries 716 and a couple of switches 706 and 708 that could be made by conventional mass fabrication techniques at a very low cost.

The microcopier MC (600) in its pen-like preferred embodiment is further illustrated in FIGS. 5A and 5B. The principal elements of the pen-like embodiment 600 illustrated in FIGS. 5A and 5B are the following: An exterior case 702 having an indent 704 therein; an on-off switch 706 and a read-write switch 708 located in the indent 704; read-write head 710; a bank of batteries 716 and a screw cap 714 for holding the batteries 716 in case 702. The chip assembly 710 rides over the surface of paper 712 as illustrated. This chip assembly 710 is mounted on a ceramic support (that is also a heat sink). The ceramic support is rigidly mounted to a spherical gimbal element 722 held in position by vice 724. Wire leads 720 pass through a hole 726 in the spherical gimbal to the block 732 which supports on-off switch 706 and read-write switch 708. The assembly 710 comprises the silicon chip 620 and the abutting gallium arsenide chip 602. The gimbal arrangement is similar to the one described in my copending application and the description with regard thereto is incorporated herein by reference. It allows the operator to maintain firm pressure of the assembly 710 on the surface of the paper regardless of the orientation of the handle.

The microcopier MC (600) must be constructed keeping human engineering in mind in order to produce the greatest convenience. One approach that might be utilized would be to eliminate all manual switching and employ instead micro switches responsive to the pressure with which the operator pushes the microcopier MC against the paper 712. In the absence of contact or pressure the microcopier MC is turned off. With moderate pressure the microcopier MC is placed in the reading mode and with firm pressure it is set into the writing mode. The setting into the writing mode also automatically sets the memory address register 622 to its zero initial position. The vice 724 supporting the gimbal ball 722 could be made to slide up and down along the case 702. It would be biased downwardly by a spring not illustrated located within case 702.

It is desirable to provide the first hot spot as a "seed" to initiate the train of hot spot fiducial markings. When the apparatus is in the reading mode it would be possible to initiate the first hot spot by activating the detector-heater pair 630 by the first signals read out of the photosensors 604. In the writing mode, with a microcopier of the first variant using only one heater as illustrated in FIGS. 1A through 2A, a time periodic excitation of the heater H could start as soon as the microcopier MC is set in that mode. As soon as the detector D of the detector-heater pair 630 senses a hot spot HP, the initiating mechanism is switched off and the automatic triggering of hot spot HP starts. The circuitry to accomplish these switching functions is readily constructable by techniques known to those of ordinary skill in the art.

In a microcopier MC built according to the second embodiment 500 (that is one utilizing two heaters, $H_1$ and $H_2$) the first seed spots are easily produced when the microcopier MC (500) is in its writing mode. The switching of the microcopier MC (500) to its writing mode automatically activates the oscillator 501. Regardless of the initial setting of counter B (504) a sufficient number of counts will cause all binary positions to be 1 and the next count will cause all positions to become 0. The transition of the last significant digit will cause circuit 509 to be activated. Also it may activate the heater pair $H_1$ and $H_2$ if the setting of the flip-flop 509 is such as to produce that activation. If not, the heaters $H_1$ and $H_2$ will be activated after another full count of counter B (after count 4096 in our previous example, occurring in 8192 microseconds or about 9 milliseconds—a relatively negligible time). Once there is a pair of hot spots to be sensed the system will enter into its steady state automatic triggering mode.

While the invention has been described according to the preferred embodiment thereof it will be appreciated by those of ordinary skill in the art that various different changes may be made to the structure and function of the invention without departing from the spirit and scope thereof. For example, the preferred embodiment 600 describes the microcopier MC illustrated in a pen-shaped case 702. It is also possible to implement the invention in a box-shaped case, such as described in my copending application. The single silicon-gallium arsenide chip assembly 710 is epoxy fastened to a ceramic substrate 650 which is gimbal mounted (elements 722 and 724) to case 702. It is possible that other mounting mechanisms may be appropriate for other circumstances. Of course larger chips can be used to accomodate a large number of channels and a bigger memory would provide the invention with a larger storage capacity. In general all of the embodiments described in my first copending application can be implemented with the electronic position ascertaining means described herein instead of through the use of the rolling wheel position reckoning means. This also applies to a microcopier MC that can copy on plain paper by sensitizing it just prior to thermal writing. For that matter, it is not necessary to use thermal sensitive paper to employ the electronic position ascertaining means of the present invention if a different type of microcopier readwrite mechanism is used in conjunction therewith.

The basic electronic position ascertaining device has application to other areas. For example, it can be used as part of a map-odometer. The mileage from one point to another on a map is often determined by a conventional map-odometer. Such an instrument has a wheel that rolls over the map and is geared to turn an indicating needle which integrates the output of the wheel. An electronic map-odometer could be made using a detector-heater pair, an electronic counter which could be decimal, character generating circuits, and a liquid crystal display. It would be relatively easy to make provisions for any scale to which the map may have been drawn and also to display miles or kilometers.

The microcopier MC itself could be a map-odometer, if slightly modified. For example, an additional decimal counter, to avoid binary-to-decimal conversion, could be used together with circuits that would generate the facsimile-like signals necessary to reproduce decimal characters. The copier in its normal mode would copy the names of the cities on the map. Hence it would be possible to duplicate on thermal paper, the print-out of the names of the cities and their distances. For example, the print-out might look something like the following:

"Princeton to New York—49 miles". Similarly, the odometer embodiment could be employed to measure distance on non-map objects such as drawings, scale photographs, charts, etc.

I claim:

1. In a hand-holdable electronic copying apparatus that copies a document by first sweeping said apparatus across said document and, at substantially constant intervals, senses information to be copied by a plurality of optical sensors and stores said information in a memory at addresses corresponding to specific positions, and then subsequently, in a second sweep of said apparatus over the material on which the copy is to be made, energizes a plurality of writing elements in accordance with the information stored in said memory at addresses corresponding to the same relative positions of said apparatus on its first sweep, the improvement comprising:

heat producing means for hot spots on a surface;

hot spot detecting means for substantially directly contacting said surface and for detecting said hot spots produced by said heat producing means;

electronic control circuit means for controlling said heat producing means so as to produce a trail of substantially equidistant hot spots;

counter means for counting the hot spots detected by said hot spot detecting means; and, means to address said memory according to the count in said counter means thereby causing said apparatus to accurately reproduce during said second sweep information sensed during said first sweep.

2. The apparatus of claim 1 wherein:

said heat producing means produces one hot spot at a time and said hot spot detecting means is located said constant interval from said heat producing means; and, wherein said electronic control circuit means causes said heat producing means to produce a hot spot in response to the detection of a hot spot by said hot spot detecting means.

3. The apparutus of claim 1, wherein the improvement further comprises:

a pen-like case for carrying the components of said apparatus; and, wherein said pen-like case is hand-holdable.

4. The apparatus of claim 1 wherein said improvement further comprises:

a box-like case for carrying the components of said apparatus; and, wherein said box-like case is hand-holdable.

5. The apparatus of claim 1 wherein said heat producing means and said hot spot detecting means are constructed on a single integrated circuit chip.

6. The apparatus of claim 5 wherein said integrated chip includes the following elements:

a plurality of light sensing element means for reading the information to be copied during said first sweep;

an electronic storage device means for storing the information from said light sensing element means;

a first group of heater element means for reproducing information stored in said electronic storage device means;

a second group of heater element means comprising at least one heater element means for producing fiducial equidistant thermal markings;

a heat sensing element means for detecting said thermal markings;

a counter means for counting said thermal markings detected by said heat sensing element means; and, circuit means for amplifying the signals from said light sensing element means and said heat sensing element means and for controlling the addressing of said electronic storage device means.

7. The apparatus of claim 6 wherein said electronic storage device means comprises a random access memory.

8. The apparatus of claim 6 wherein said electronic storage device means comprises a shift register.

9. The apparatus of claim 6 wherein said integrated chip further includes:

an electronic oscillator.

10. An odometer apparatus for measuring the distance said apparatus travels as it sweeps over a surface, said apparatus comprising:

two heater means spaced a predetermined distance apart and carried by said odometer apparatus for producing simultaneously a pair of hot spots on said surface in response to a trigger pulse;

a hot spot detecting means for detecting said hot spots, said hot spot detecting means being carried by said odometer apparatus and located in line with said two heater means at a distance from the first heater means of said two heater means no greater than said predetermined distance between said two heater means;

an oscillator whose period of oscillation is substantially shorter than the travel time of said apparatus over said predetermined distance;

a first counting means to count the oscillations of said oscillator;

means to start the counting of said first counting means in response to the detection of the first hot spot of said pair of hot spots;

means to stop said counting in response to the detection of the second hot spot of said pair, thereby obtaining a count characteristic of the time of travel over said predetermined distance by said apparatus;

means to simultaneously trigger said two heater means at intervals of time equal to twice said time of travel over said predetermined distance; and, said counting means to count the number of times said hot spots are detected by said hot spot detecting means, wherein the count in said second counting means is a measure of the distance travelled by said odometer apparatus.

11. A method for producing and counting equidistant hot spots on a surface by an apparatus including two heater means for producing a pair of hot spots, a detecting means, a first counting means, a second counting means and an oscillator means, said method comprising the steps of:

triggering said two heater means simultaneously by a trigger signal to produce said pair of hot spots;

detecting by said detecting means the first spot of said pair of hot spots;

initiating the counting of said first counting means in response to the detection of said first hot spot and then counting the periods of said oscillator means whose periods are substantially shorter than the travel time of said apparatus over said surface;

stopping said first counting means in response to the detection of said second hot spot of said pair of hot spots;

triggering said pair of heater means at time intervals corresponding to the time taken to obtain twice said count in said first counting means; and, counting hot spots detecting by said hot spot detecting means in said second counting means, whereby said hot spots produced on said surface are substantially equidistant and their number is equal to the count in said second counting means.

12. An odometer apparatus for determining its own position within the precision of a predetermined distance, as said apparatus is swept along a path over a surface, said apparatus comprising on a single integrated circuit semiconductor chip, the following elements:

two electrically heatable portions located on said chip said predetermined distance apart;

temperature measuring diode means located in line with said two electrically heatable portions and located no more than said predetermined distance from one of said heatable portions;

an electronic oscillator means;

a first counter means for counting oscillations from said oscillator means;

controlling circuit means for energizing said two heatable portions so as to produce a train of hot spots on said surface, said hot spots being spaced said predetermined distance apart; and, a second counter means for counting the detection of said hot spots by said diode means.

13. The apparatus of claim 12 in which said predetermined distance is 200 micrometers.

14. The apparatus of claim 12 in which said predetermined distance is 50 micrometers.

15. In a hand-holdable electronic copying apparatus that copies a document by first sweeping said apparatus across said document and, at substantially constant intervals, senses information to be copied by a plurality of optical sensors and stores said information in a memory at addresses corresponding to specific positions, and then subsequently, in a second sweep of said apparatus over the material on which the copy is to be made, energizes a plurality of writing elements in accordance with the information stored in said memory at address corresponding to the same relative positions of said apparatus on its first sweep, the improvement comprising:

heat producing means for producing hot spots on a surface, said heat producing means including two heater elements for producing two hot spots simultaneously in response to a single trigger signal, said heater elements being spaced by said constant interval apart;

hot spot detecting means for detecting said hot spots produced by said heat producing means;

electronic control circuit means for controlling said heat producing means so as to produce a trail of substantially equidistant hot spots, said electronic control circuit means producing said trigger signal in response to the detection of said hot spots by said hot spot detecting means as a result of the detection of two consecutive hot spots in every alternate pair of hot spots;

counter means for counting the hot spots detected by said hot spot detecting means; and, means to address said memory according to the count in said counter means therby causing said apparatus to accurately reproduce during said second sweep information sensed during said first sweep.

16. An apparatus for producing countable, disappearing and substantially equidistant fiducial markings on a surface, said markings comprising hot spots produced in pairs, one pair after the other as said apparatus is moved along a path on said surface, said apparatus comprising:

detecting means for detecting the temperature of said hot spots;

means for measuring the time elapsing between the detection of the first hot spot of a pair and the second hot spot of said pair; and, means for producing pairs of hot spots in response to said time measuring means.

17. An apparatus for reading a document that, when swept over said document, provides two sets of related signals, one characterizing equidistant positions of said apparatus over said document, the other characterizing information on the document at said locations, said apparatus comprising:

heat producing means for producing hot spots on said document;

hot spot detecting means for substantially directly contacting said document and for detecting hot spots produced by said heat producing means;

electronic control circuit means for energizing said heat producing means in response to said hot spot detecting means, so as to produce hot spots spread equal intervals apart;

counter means to count the number of times a hot spot is detected by said hot spot detecting means; and, information reading means activatable by the count in said counter means.

18. An apparatus for writing information on a surface in response to a series of consecutive sets of signals characterizing said information at equal intervals along a path, said apparatus being operable by being swept along said path, said apparatus comprising:

heat producing means for producing hot spots on said surface;

hot spot detecting means for substantially directly contacting said surface and for detecting said hot spots;

electronic control circuit means for controlling the energization of said heat producing means in response to the detecting of hot spots by said hot spot detecting means, so as to produce hot spots spaced at equal intervals apart;

counter means for counting the number of times a hot spot is detected by said hot spot detecting means; and, writing means responsive to said set of information signals and activatable by the count of said counter means.

19. A portable copier apparatus for producing copies by sweeping said apparatus over a writing surface, said apparatus comprising:

heat producing means for producing hot spots on said writing surface;

hot spot detecting means for substantially directly contacting said writing surface and for detecting the hot spots produced by said heat producing means;

electronic circuit means connected to said heat producing means and to said hot spot detecting means for energizing said heat producing means in response to the detection of hot spots by said hot spot detecting means, said electronic circuit means including a counter means for counting the number of times that a hot spot is detected by said hot spot detecting means; and, writing means activated by the count in said counter means.

20. A method for activating the read and write functions of a hand-holdable electronic copying device that is swept over a first surface and subsequently over a second surface, said method comprising the steps of:
(i) sweeping said device over said first surface;
(ii) producing hot spots on said first surface by energizing a heat producing means;
(iii) detecting said hot spots with a hot spot detecting means in substantially direct contact with said first surface;
(iv) controlling said heat producing means in response to the detection of said hot spots by said detecting means so as to produce substantially equidistant hot spots on said first surface;
(v) counting said hot spots detected by said hot spot detecting means;
(vi) sweeping said device over said second surface during a second sweep;
(vii) activating the write function of said device on said second surface during said second sweep.

21. An apparatus for use with a hand-holdable electronic copying device and for producing a train of closely spaced, substantially equidistant hot spots by sweeping said apparatus over a surface, said apparatus including a source of energy and a single integrated circuit chip that comprises:
at least one electrically heatable means located on a face of said chip;
at least one diode temperature detecting means for substantially directly contacting said surface and located on the same face as said chip as said heatable means; and,
control circuit means responsive to said diode temperature detecting means for controlling the energizing of said electrically heatable means.

22. The apparatus of claim 1 in which said integrated circuit chip further includes:
counting means to count said hot spots as said apparatus is swept over said surface.

23. An odometer apparatus for use with a hand-holdable electronic copying device and for determining the position of said apparatus as said apparatus is swept along a path over a surface, said apparatus comprising an integrated circuit semiconductor chip including the following elements:
an electrically heatable portion of said chip;
a temperature measuring diode means for substantially directly contacting said surface;
electronic circuit means for energizing said heatable portion in response to the detection by said temperature measuring diode means of hot spots produced by said heatable portion; and,
electronic counting means for counting said hot spots,
wherein said count in said counting means characterizes the position of said apparatus swept along said path over said surface.

24. The apparatus of claim 1 wherein the distance between said diode means and said heatable portion is approximately 200 microns.

25. The apparatus of claim 1 wherein said distance between said diode means and said heatable portion is approximately 50 microns.

26. An apparatus for use with a hand-holdable electronic copying device and for measuring the position of said device over a first body during a first sweep in which information is read from said first body and then subsequently activating said device on the surface of a second body during a second sweep to write information on said second body, said apparatus comprising:
heat producing means carried as part of said apparatus for producing hot spots when said device is activated on the surface of said first and said second bodies during said first and said second sweeps respectively;
temperature detecting means for substantially directly contacting said surface and for detecting said hot spots produced by said heat producing means on said first and second bodies, said temperature detecting means carried as part of said apparatus and spaced a predetermined distance apart from said heat producing means;
electronic circuit means connected between said heat producing means and said temperature detecting means for energizing said heat producing means in response to the detection of at least one hot spot by said temperature detecting means;
counter means for counting the number of hot spots detected; and,
means to activate said device during said second sweep of said apparatus when the count in said counter means during said second sweep is the same as it was during said first sweep.

27. An odometer apparatus for measuring the distance that said apparatus travels as it sweeps over the surface of a thermosensitive paper so as to leave no permanent physical change on said paper, said apparatus comprising:
heating means to heat spot areas of said paper to a relatively low temperature which does not permanently darken said paper, said hot spot areas being spaced in the neighborhood of several hundred microns apart;
detecting means to detect the presence of said relatively low temperature hot spot areas;
control means to control said heating means so that a train of substantially equidistant hot spot areas is produced; and,
counting means to count said hot spot areas.

28. The apparatus of claim 27 wherein said relatively low temperature is not greater than 65° C.

29. A method for measuring the distance that an odometer apparatus travels as it sweeps over the surface of a thermosensitive paper so as to leave no permanent visible changes on said paper, said method comprising the following steps:
(i) heating spots on the surface of said paper to a relatively low temperature that does not permanently darken said paper, said hot spots being spaced in the neighborhood of several hundred microns apart;
(ii) detecting the presence of said hot spots by measuring said relatively low temperature;
(iii) controlling the heating of said spots so as to insure that they are substantially equidistantly spaced; and,
(iv) counting said spots.

30. The method of claim 29 wherein said relatively low temperature is not greater than 65° C.

31. An apparatus for producing countable, disappearing, equidistant fiducial markings on a surface, said marking comprising hot spot areas produced one after another as said device is moved along a path over said surface, said apparatus comprising:

means for substantially directly contacting said surface and for detecting one marking by its temperature characteristics; and, heat producing means for producing the next marking spaced apart from said detecting means by a predetermined spacing equal to the spacing between adjacent fiducial markings, said predetermined spacing being in the neighborhood of several hundred microns.

* * * * *